United States Patent [19]

Kurio et al.

[11] Patent Number: 4,729,726
[45] Date of Patent: Mar. 8, 1988

[54] HOUSING STRUCTURE FOR A MULTIPLE-ROTOR TYPE ROTARY PISTON ENGINE

[75] Inventors: Noriyuki Kurio; Nobuhiro Yamamoto; Junichi Funamoto; Yoriaki Fujimoto, all of Hiroshima, Japan

[73] Assignee: Mazda Motor Corporation, Hiroshima, Japan

[21] Appl. No.: 942,283

[22] Filed: Dec. 16, 1986

[30] Foreign Application Priority Data

Dec. 17, 1985 [JP] Japan .................... 60-287464

[51] Int. Cl.4 ................ F01C 1/22; F01C 21/10
[52] U.S. Cl. ................... 418/60; 418/61 A; 418/94
[58] Field of Search .......... 418/60, 61 A, 212, 213, 418/94; 123/242

[56] References Cited

U.S. PATENT DOCUMENTS

| 3,700,362 | 10/1972 | Verge et al. | 418/60 |
| 4,268,231 | 5/1981 | Corwin et al. | 418/60 |

FOREIGN PATENT DOCUMENTS

| 60-69204 | 4/1985 | Japan | 418/60 |
| 60-69205 | 4/1985 | Japan | 418/60 |
| 60-69207 | 4/1985 | Japan | 418/60 |
| 60-69208 | 4/1985 | Japan | 418/60 |
| 60-69209 | 4/1985 | Japan | 418/60 |

Primary Examiner—John J. Vrablik
Assistant Examiner—Leonard P. Walnoha
Attorney, Agent, or Firm—Fleit, Jacobson, Cohn & Price

[57] ABSTRACT

A rotary piston engine including a casing comprised of three rotor housings, intermediate housings between the rotor housings and side housings attached to the outer sides of the outer side housings. An eccentric shaft assembly is provided for carrying rotors in the casing. The eccentric shaft assembly includes a first shaft and a second shaft which are connected together with one end of the second shaft located in one of the intermediate housings. The housings of the casing are connected together by first tightening bolts which are inserted through the housing at one side of the one intermediate housing and threaded to the one intermediate housing and second tightening bolts which are inserted through the housings at the other side of the one intermediate housing and threaded to the one intermediate housing.

10 Claims, 3 Drawing Figures

HOUSING STRUCTURE FOR A MULTIPLE-ROTOR TYPE ROTARY PISTON ENGINE

BACKGROUND OF THE INVENTION

1. Field of the Invention

The present invention relates to rotary piston engines, and more particularly to housing structures for rotary piston engines. More specifically, the present invention pertains to housing structures for multiple-rotor type rotary piston engines.

2. Description of the Prior Art

In recent years, there is an increasing trend of providing vehicles with high power engines so that the user's demands are satisfactorily met. In the field of rotary piston engines, two rotor type engines have commonly been used, however, rotary piston engines having three or more rotors are being developed to provide a high output power. One example of such multiple-rotor engine is shown in Japanese patent application No. 58-163171 which has been filed on Sept. 7, 1986 and disclosed for public inspection on Apr. 19, 1986 under the disclosure number 60-69208.

In these multiple-rotor engines, problems are produced in that the eccentric shaft must have three or more eccentric shaft sections. In rotary piston engines, the rotors are formed with internal gears which are in meshing engagements with stationary gears provided on the housings. In case where the eccentric shaft has three or more eccentric shaft portions, the shaft cannot be of a one-piece structure because it will become impossible or very difficult to assemble the stationary gears on the housing. In view of the problems, proposals have been made to divide the eccentric shaft into two pieces and connect them together so that they rotate as a unit. Examples of three rotor engines having such eccentric shafts of two-piece construction are shown by Japanese patent diclosures Nos. 60-69204, 60-69205, 60-69207 and 60-69209. In the engine as disclosed by these patent applications, a first eccentric shaft element is provided with two eccentric shaft sections and a second eccentric shaft element having one eccentric shaft section is fittedto the first element to rotate therewith.

As disclosed by the aforementioned Japanese patent applications, the rotary piston engine of this type includes a casing comprised of a plurality of rotor housings assembled together with an intermediate housing disposed between each two rotor housings and a side housing attached to the outer side surface of the outside rotor housing. Those housings are connected together by a suitable number of tightening bolts which are passed through the entire thickness of the casing. The eccentric shaft is located in the casing so that one end of the second eccentric shaft element is at a logitudinally intermediate portion of the casing. It should be noted, however, that this structure has problems in that the eccentric shaft has a minimum rigidity at the portion where the aforementioned one end of the second eccentric shaft element is located with the result that the casing also has the minimum rigidity at a portion corresponding to the said one end of the second eccentric shaft element. Where the housings in the casing are connected together by connecting bolts which pass through the entire thickness of the casing, the connecting bolts are subjected to a large bending stress at the portions corresponding to the said one end of the second eccentric shaft element and therefore the connections between the housings of the casing may be loosened. Further, this structure is inconvenient to assemble because it is required to locate all housings of the casing in axially aligned positions and insert the connecting bolts into axially aligned bolt holes formed in the housings. In this assembling procedure, difficulties may be encountered in inserting the connecting bolts into the bolt holes unless the housings are exactly aligned positions.

SUMMARY OF THE INVENTION

It is therefore an object of the present invention to provide a housing structure for a rotary piston engine having three or more rotors in which the bending stress in the tightening bolts can be decreased.

Another object of the present invention is to provide a housing structure for a multiple rotor type rotary piston engine wherein loosening of the connection between the housings can be effectively prevented.

A further object of the present invention is to provide a housing structure for a rotary piston engine which is convenient to assemble.

According to the present invention, the above and other objects can be accomplished by a rotary piston engine including a casing comprised of a plurality of rotor housings each having an inner wall surface of trochoidal configuration, an intermediate housing between each adjacent pair of the rotor housings to close one side of each rotor housing, a side housing attached to an outer side surface of an axially outermost one of the rotor housings, a rotor of a polygonal configuration disposed in each of the rotor housings to rotate with apex portions in sliding contact with the inner wall surface of the rotor housing, an eccentric shaft assembly located in said casing for carrying said rotors, said eccentric shaft assembly comprising a first eccentric shaft and a second eccentric shaft which are connected together with one end of the second eccentric shaft located in said intermediate housing, said housings being connected together by first tightening bolts inserted through the housings at one side of the intermediate housing where said one end of the second eccentric shaft is located and connected to the same intermediate housing and second tightening bolts inserted through the housings at the other side of the same intermediate housing and connected to the same intermediate housing.

According to the features of the present invention, it is possible to prevent the tightening bolts from being subjected to a large bending stress as in the known structures. Further, the structure of the present invention is convenient to assemble because it is not required to arrange all of the housings in exactly aligned positions before the connecting bolts are inserted.

The above and other objects and features of the present invention will become apparent from the following descriptions of a preferred embodiment taking reference to the accompanying drawings.

DESCRIPTION OF THE PREFERRED EMBODIMENT

Figure 2:
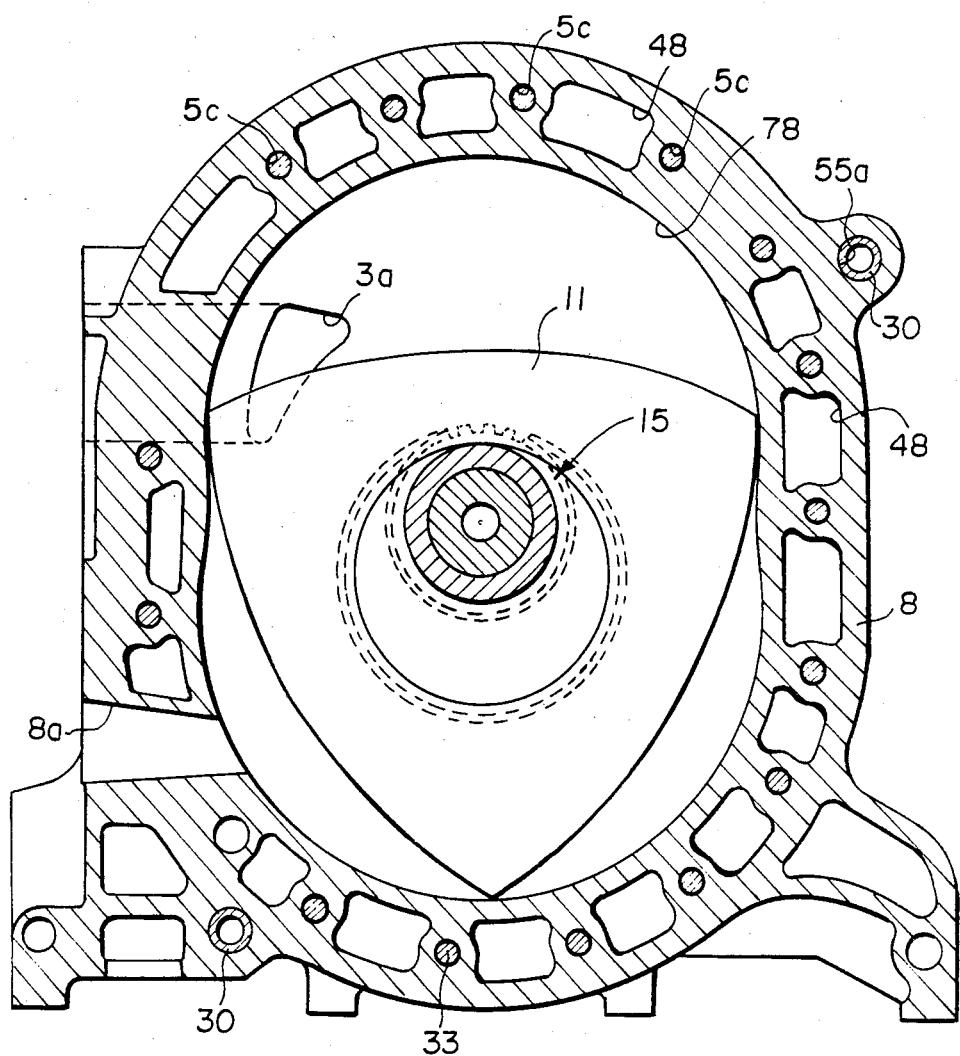
FIG. 2 is a cross-sectional view of the rotary piston engine shown in FIG. 1; and, FIG. 3 is a front view of the intermediate housing embodying the feature of the present invention.

Referring to the drawings, the engine shown therein includes a casing 1 which is constituted by three rotor housings 6, 7 and 8, two intermediate housing 4 and 5 located between respective pairs of the rotor housings 6 and 7, and 7 and 8, and two side housings 2 and 3 which are attached to the outer side surfaces of the outside rotor housing 6 and 8, respectively. The rotor housings 6, 7 and 8 have inner wall surfaces, 76, 77 and 78 of trochoidal configuration. In the casing 1, there are defined three rotor cavities 12, 13 and 14 which are formed in the rotor housings 6, 7 and 8, respectively. Rotors 9, 10 and 11 of substantially triangular configuration are disposed in the rotor cavities 12, 13 and 14, respectively, for rotation with the apex portions in sliding contact with the trochoidal inner walls 76, 77 and 78 of the rotor housings 6, 7 and 8, as shown in FIG. 2 with respect to the rotor 11. The rotor housing 8 is formed with an exhaust port 8a and the side housing 3 is formed with an intake port 3a.

Figure 1:
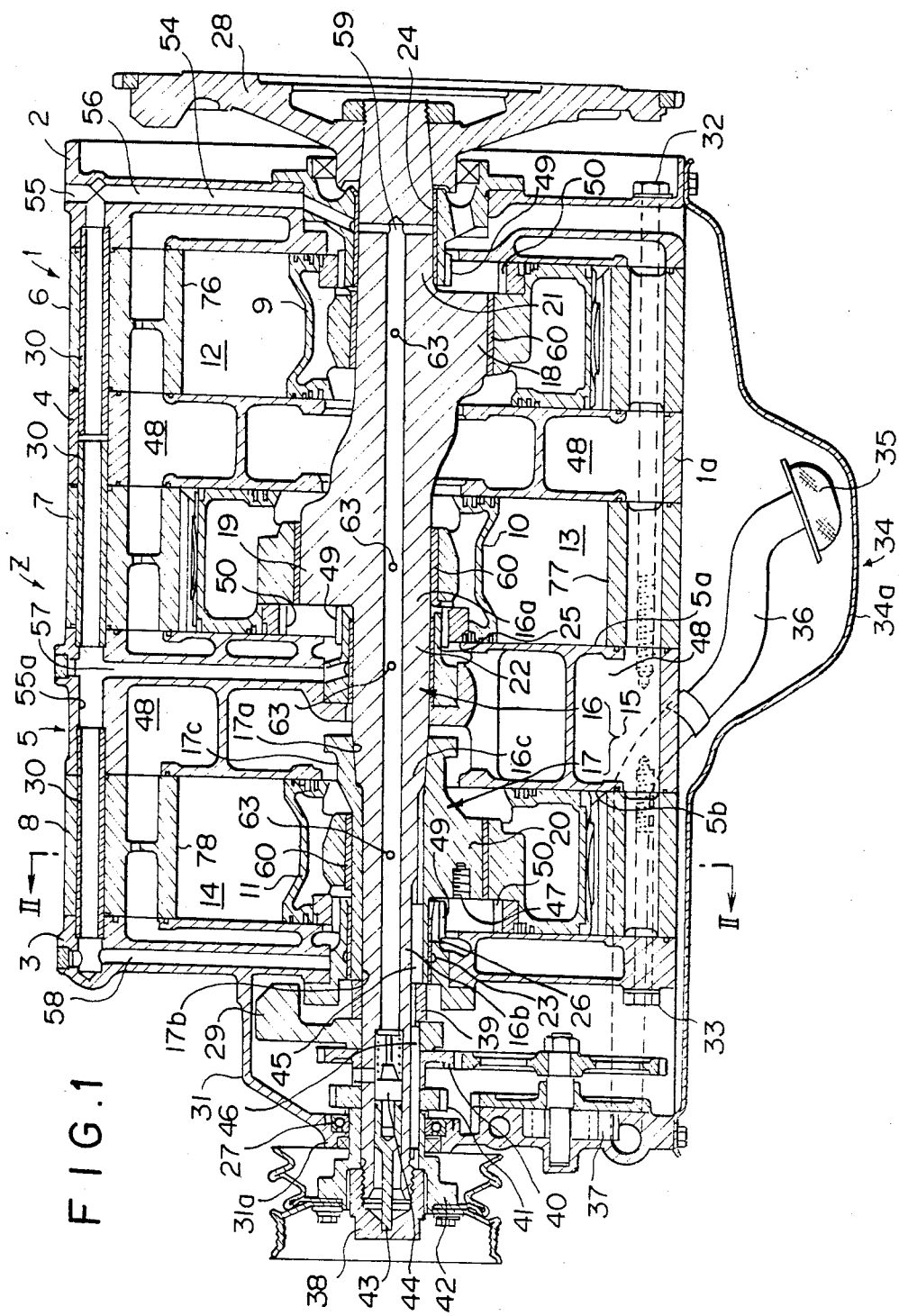
FIG. 1 is an axially sectional view of a three rotor type rotary piston engine in accordance with one embodiment of the present invention.

The rotors 9, 10 and 11 are carried by an eccentric shaft assembly 15 having eccentric portions 18, 19 and 20 for rotatably supporting the rotors 9, 10 and 11, respectively, through bearings 60. As shown in FIGS. 1 and 2, each of the rotors is provided with an internal gear 50 which is concentric with the center of the triangle of the rotor and the casing 1 is provided with an external gear 49 which is concentric with the eccentric shaft assembly 15 and in meshing engagement with the internal gear 50. Speaking more specifically, the side housing 2, the intermediate housing 5 and the side housing 3 are provided with the gears 49 for the internal gears 50 for the rotors 9, 10 and 11, respectively.

Since the eccentric portions 18, 19 and 20 for the rotors 9, 10 and 11 are offset from each other by 120°, it is impossible to insert the eccentric shaft through the external gear 49 which is fitted to the intermediate housing 5 if the eccentric shaft is of one-piece structure. Thus, in the illustrated embodiment, the eccentric shaft assembly 15 is comprised of a first eccentric shaft element 16 formed with the eccentric portions 18 and 19 and a second eccentric shaft element 17 formed with the eccentric portion 20 as shown in FIG. 1. The first shaft element 16 has a length which is sufficient to extend through the overall length of the casing 1 with the opposite ends projecting from the ends of the casing 1 by appropriate distances. The first eccentric shaft element 16 has a large diameter portion 16a which is formed with journal portions 21 and 22 at portions axially outside the eccentric portions 18 and 19, respectively, and the first eccentric shaft element 16 is journalled on the casing 1 by bearings 24 and 25 on the external gears 49 on the side housing 2 and the intermediate housing 5, respectively. The large diameter portion 16a of the first eccentric shaft element 16 continues axially to a small diameter portion 16b with a tapered portion 16c therebetween.

The second eccentric shaft element 17 is of a tubular form having an axial bore including a tapered portion 17a adapted to be fitted to the tapered portion 16c on the first element 16 and a straight portion 17b adapted to be fitted to the small diameter portion 16b of the first element 16. The first eccentric shaft element 16 is fitted to the second element 17 by inserting the small diameter portion 16b of the first element 16 into the bore of the second element 17 so that the tapered portion 17a of the bore is fitted to the tapered portion 16c of the first eccentric shaft element 16 and the straight portion 17b of the bore is fitted to the small diameter portion 16b of the first element 16. The first and the second eccentric shaft elements 16 and 17 are connected together by means of a key 45 so that they rotate as a unit. The second eccentric shaft element 17 is formed with a journal portion 23 where the second element 17 is journalled by a bearing 26. In FIG. 1, it will be noted that that the second eccentric shaft element 17 has an inner end portion 17c which is located in the intermediate housing 5 disposed between the rotor housings 7 and 8.

In FIG. 1, it will be noted that the eccentric shaft assembly 15 is provided at an end adjacent to the side housing 2 with an output gear 28 which is mounted on the end of the first eccentric shaft element 16. At the other end, the first eccentric shaft element 16 carries a balancing weight 29, an oil pump driving gear 40 for driving an oil pump 37, a distributor driving gear 41 and a pulley attaching stub shaft 42 which are mounted on the first element 16 in this order from the axially intermediate portion of the shaft element 16. A spacer sleeve 39 is disposed between the outer end of the second element 17 and the balancing weight 29. A tightening nut 38 is threaded into the outer end of the first eccentric shaft element so that the second eccentric shaft element 17 and the parts 39, 29, 40, 41 and 42 are tightly held on the first element 16. An end cover 31 is attached to the side housing 3 to cover the balancing weight 29, the gears 40 and 41 and the stub shaft 42. The end cover 31 has a boss 31a which supports the stub shaft rotatably through a bearing 27. A key 46 is provided between the first eccentric shaft element 17 and the balancing weight 29, the gears 40 and 41 and the stub shaft 42 so that these parts rotate together with the eccentric shaft assembly 15 as a unit.

Under the casing 1, there is provided an oil pan 34 which is formed with an oil reservoir 34a. An oil suction pipe 36 is disposed in the oil pan 34 and has an oil strainer 35 located in the oil pan 34a. The oil suction pipe 36 is connected to the oil pump 37 which draws the lubricant oil from the oil pan 34a and supplies to a lubricant oil supply passage 54. The oil passage 54 has an oil inlet 55 which is connected with three divisional passages 56, 57 and 58. The passage 56 is connected to the bearing 24 whereas the passages 57 and 58 are connected to the bearings 25 and 26, respectively. The passages 56 and 57 are further connected with an axial passage 59 which is formed in the first eccentric shaft element 16. The element 16 is further formed with radial passages 63 leading to the bearings 60 so that the lubricant oil from the passages 56 and 57 are used to lubricate the bearings 60. The lubricant oil in the axial passage 59 is also supplied through oil jets of a known structure to inner cavities of the rotors 9, 10 and 11 to cool the rotors.

The lubricant oil in the passage 58 is used only for lubricating the bearing 26. This is because the bearing 26 is apt to be subjected to an uneven wear than the bearings 24 and 25 due to the bending load on the eccentric shaft assembly 15. In order to avoid the effects of the bending load, the bearing 26 is of a smaller axial length than the bearings 24 and 25 and a greater quantity of lubricating oil is supplied to the bearing 26 than to the bearings 24 and 25 to thereby avoid any possible local wear. At an end of the axial passage 59 opposite to the passage 56, there is provided an oil pressure control valve 44 which is held in position by a valve holder 43.

The previously mentioned nut 38 functions to maintain the valve holder 43 in position.

Figure 3:
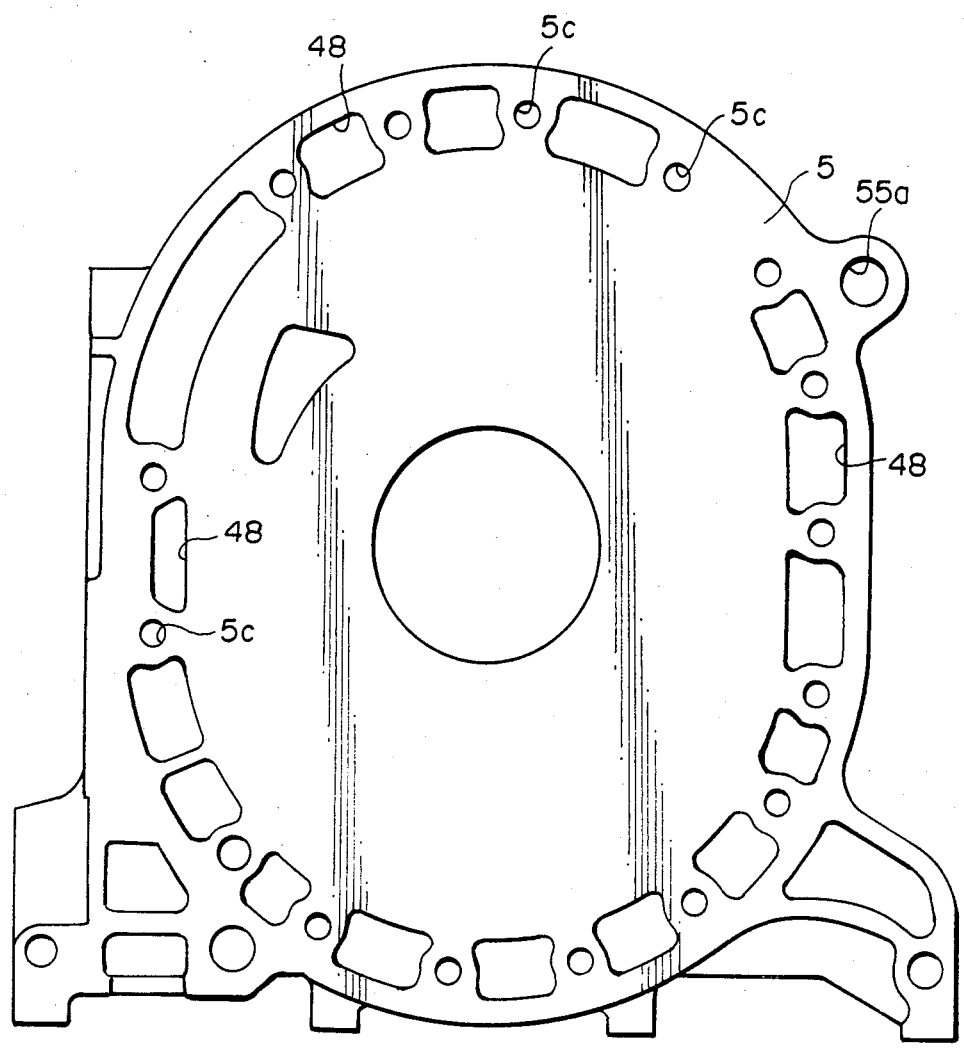

In assembling the casing 1, tightening bolts 32 and 33 are used. As shown in FIG. 1, the bolt 32 is inserted from the outside of the side housing 2 through the side housing 2, rotor housing 6, the intermediate housing 4 and the rotor housing 7 into the intermediate housing 5. The inner end portion of the bolt 32 is threaded into the intermediate housing 5 from the side surface 5a thereof. Referring to FIG. 3, it will be noted that the intermediate housing 5 is formed with cooling water jackets 48 which are located peripherally spaced positions. Adjacent to the cooling water jackets, there are formed threaded bolt holes 5c to which the tightening bolts 32 are inserted. In the back side, the intermediate housing 5 is also formed with similar threaded bolt holes.

The tightening bolt 33 is smaller in length than the bolt 32 and inserted from the outside surface of the side housing 3 through the side housing 3 and the rotor housing 8 and threadably engaged with the bolt holes formed in the back side of the intermediate housing 5. In FIG. 1, it will be noted that the lubricating oil inlet 55 is connected with an axial passage 55a which is formed through the housings 2, 6, 4, 7, 5, 8 and 3 to lead to the oil passages 57 and 58. Knock pins 30 are inserted into the oil passage 55a to constrain the housings in peripheral directions. Speaking more specifically, one knock pin 30 is positioned to bridge the housings 2, 6 and 4 so that these housings are constrained with each other in the peripheral directions. Another knock pin 30 is positioned to bridge the housings 4, 7 and 5. The other knock pin 30 is bridged between the housings 5, 8 and 3. As shown in FIG. 2, a further set of knock pins 30 are inserted through the housings at a radially opposite position.

In case where the eccentric shaft is of a two-piece structure as described, the eccentric shaft tends to be bent at the end portion 17c of the second eccentric shaft element 17 under the bending load on the eccentric shaft assembly 15 which is produced by the combustion pressure in the engine and transmitted to the shaft assembly 15 through the eccentric portions 18, 19 and 20. This is because the eccentric shaft assembly 15 has the smallest rigidity in the vicinity of the end portion 17c of the second shaft element 17. Therefore, the casing 1 also has the smallest rigidity in the corresponding area. Where the tightening bolts are arranged to extend throughout the length of the casing 1, the bolts will be subjected to a substantial bending load at the portion where the casing has the smallest rigidity. In the aforementioned structure, however, the tightening bolts 32 and 33 do not extend through the intermediate housing 5 so that the bolts are not subjected to an extremely large bending load. It is therefore possible to increase the reliability of the tightening of the casing 1.

The invention has thus been shown and described with reference to a specific embodiment, however, it should be noted that the invention is in no way limited to the details of the illustrated structures but changes and modifications may be made without departing from the scope of the appended claims.

We claim:

1. A rotary piston engine including a casing comprised of a plurality of rotor housings each having an inner wall surface of trochoidal configuration, an intermediate housing between each adjacent pair of the rotor housings to close one side of each rotor housing, a side housing attached to an outer side surface of an axially outermost one of the rotor housings, a rotor of a polygonal configuration disposed in each of the rotor housings to rotate with apex portions in sliding contact with the inner wall surface of the rotor housing, an eccentric shaft assembly located in said casing for carrying said rotors, said eccentric shaft assembly comprising a first eccentric shaft and a second eccentric shaft which are fitted together by placing said second eccentric shaft over said first eccentric shaft at a fitting position with said fitting position and one end of the second eccentric shaft located in one of the intermediate housings, said housings being connected together only by first tightening bolts inserted through the housings at one side of the intermediate housing where said one end of the second eccentric shaft is located and connected to the same intermediate housing and second tightening bolts inserted through the housings at the other side of the same intermediate housing and connected to the same intermediate housing so that there exists no tightening bolt which extends through the same intermediate housing.

2. A rotary piston engine in accordance with claim 1 in which lack of the tightening bolts for the casing are connected at one end to said intermediate housing.

3. A rotary piston engine including a casing comprised of at least three rotor housings each having an inner wall surface of trochoidal configuration, an intermediate housing between each adjacent pair of the rotor housings to close one side of each rotor housing, a side housing attached to an outer side surface of an axially outermost one of the rotor housings, a rotor of a polygonal configuration disposed in each of the rotor housings to rotate with apex portions in sliding contact with the inner wall surface of the rotor housing, an eccentric shaft assembly located in said casing for carrying said rotors, said eccentric shaft assembly comprising a first eccentric shaft and a second eccentric shaft which are fitted together by placing said second eccentric shaft over said first eccentric shaft at a fitting position with said fitting position and one end of the second eccentric shaft located in one of said intermediate housings, said housings being connected together only by first tightening bolts inserted through the housings at one side of said one intermediate housing and connected to said one intermediate housing and second tightening bolts inserted through the housings at the other side of said one intermediate housing and connected to said one intermediate housing so that there exists no tightening bolt which extends through the same intermediate housing.

4. A rotary piston engine in accordance with claim 3 in which said first eccentric shaft has eccentric portions for two adjacent rotors and said second eccentric shaft has at least one eccentric portion for the other rotor.

5. A rotary piston engine including a casing comprised of at least three rotor housings each having an inner wall surface of trochoidal configuration, an intermediate housing between each adjacent pair of the rotor housings to close one side of each rotor housing, a side housing attached to an outer side surface of an axially outermost one of the rotor housings, a rotor of a polygonal configuration disposed in each of the rotor housings to rotate with apex portions in sliding contact with the inner wall surface of the rotor housing, an eccentric shaft assembly located in said casing for carrying said rotors, said eccentric shaft assembly comprising a first eccentric shaft and a second eccentric shaft which are fitted together by placing said second eccentric shaft over said first eccentric shaft with one end of the second eccentric shaft located in an axially intermediate portion of said casing, said housing being connected together only by first tightening bolts inserted through the housings at one side of one intermediate housing which is closest to the one end of the second eccentric shaft and connected to said one intermediate housing and second tightening bolts inserted through the housings at the other side of said one intermediate housing and connected to said one intermediate housing so that there exists no tightening bolt which extends through the same intermediate housing.

6. A rotary piston engine in accordance with claim 1 in which said first eccentric shaft includes a tapered portion in said fitting position, said second eccentric shaft being formed at said fitting position with a tapered bore which is fitted to the tapered portion of the first eccentric shaft.

7. A rotary piston engine in accordance with claim 1 in which said second eccentric shaft is provided at one axial end portion of the casing, said first eccentric shaft being provided at another axial end portion of the casing with engine output means, said second eccentric shaft being supported by bearing means which has a axial length which is smaller than axial length of bearing means for supporting said first eccentric shaft.

8. A rotary piston engine in accordance with claim 7 in which said bearing means for the second eccentric shaft is supplied with lubricant in a quantity which is greater than a quantity of lubricant supplied to the bearing means for supporting the first eccentric shaft.

9. A rotary piston engine including a casing comprised of a plurality of rotor housings each having an inner wall surface of trochoidal configuration, an intermediate housing between each adjacent pair of the rotor housings to close one side of each rotor housing, a side housing attached to an outer side surface of an axially outermost one of the rotor housings, a rotor of a polygonal configuration disposed in each of the rotor housings to rotate with apex portions in sliding contact with the inner wall surface of the rotor housing, an eccentric shaft assembly located in said casing for carrying said rotors, said eccentric shaft assembly comprising a first eccentric shaft extending throughout an axial length of said casing and a second eccentric shaft of a hollow tubular configuration through which said first eccentric shaft is inserted, and first eccentric shaft being formed with a tapered portion at a position located in one of the intermediate housings, said second eccentric shaft being formed at one end with a tapered bore which is fitted to said tapered portion of said first eccentric shaft, said housings being connected together only by first tightening bolts inserted through the housings at one side of the intermediate housing where said one end of the second eccentric shaft is located and connected to the same intermediate housing and second tightening bolts inserted through the housings at the other side of the same intermediate housing and connected to the same intermediate housing so that there exists no tightening bolt which extends through the same intermediate housing.

10. A rotary piston engine in accordance with claim 9 in which said second eccentric shaft supports a smaller number of rotors than said first eccentric shaft.

* * * * *